US011945344B2

(12) United States Patent
Longenecker et al.

(10) Patent No.: US 11,945,344 B2
(45) Date of Patent: Apr. 2, 2024

(54) MAGNETIC SHOULDER HARNESS BUCKLE FOR A CHILD RESTRAINT

(71) Applicant: ARTSANA USA, INC., Lancaster, PA (US)

(72) Inventors: Michael L. Longenecker, Lancaster, PA (US); Michael S. Degrace, Red Lion, PA (US); Matthew J. Ransil, Richland, PA (US)

(73) Assignee: Artsana USA, Inc., Lancaster, PA (US)

( * ) Notice: Subject to any disclaimer, the term of this patent is extended or adjusted under 35 U.S.C. 154(b) by 0 days.

(21) Appl. No.: 17/975,096

(22) Filed: Oct. 27, 2022

(65) Prior Publication Data

US 2023/0202358 A1 Jun. 29, 2023

Related U.S. Application Data

(60) Provisional application No. 63/293,325, filed on Dec. 23, 2021.

(51) Int. Cl.
*A44B 11/25* (2006.01)
*B60N 2/26* (2006.01)

(52) U.S. Cl.
CPC .......... *B60N 2/265* (2013.01); *A44B 11/2519* (2013.01); *A44B 11/2546* (2013.01)

(58) Field of Classification Search
CPC ............ A44D 2203/00; A44B 11/2519; A44B 11/2456; A44B 11/258
See application file for complete search history.

(56) References Cited

U.S. PATENT DOCUMENTS

| | | |
|---|---|---|
| 1,271,650 A | 7/1918 | Arkin |
| 5,868,445 A | 2/1999 | Kaufman et al. |
| 7,445,286 B2 | 11/2008 | Siewertsen et al. |
| 7,735,919 B2 | 6/2010 | Chen et al. |
| 8,038,214 B2 | 10/2011 | Brandl et al. |
| 8,240,772 B2 | 8/2012 | Kawata et al. |
| 8,328,289 B2 | 12/2012 | Tharp |
| 8,353,544 B2 | 1/2013 | Fiedler |
| 8,430,434 B2 | 4/2013 | Fiedler |
| 8,465,102 B2 | 6/2013 | Morrissey |
| 8,608,246 B1 | 12/2013 | Teague |
| 8,985,697 B2 | 3/2015 | Johnson |
| 9,307,808 B1 | 4/2016 | Lill |
| 9,428,143 B2 | 8/2016 | Sparling |
| 9,555,935 B2 | 1/2017 | Fiedler |
| 9,572,410 B2 | 2/2017 | Fiedler |
| 10,085,521 B2 | 10/2018 | Chen et al. |
| 10,457,246 B2 | 10/2019 | Coakley et al. |
| 10,640,018 B2 | 5/2020 | Coakley et al. |
| 10,874,178 B2 | 12/2020 | Cheng |

(Continued)

FOREIGN PATENT DOCUMENTS

| | | |
|---|---|---|
| EP | 3858182 A1 | 8/2021 |
| GB | 2419917 A | 10/2006 |

*Primary Examiner* — Robert Sandy
(74) *Attorney, Agent, or Firm* — Saxton & Stump, LLC

(57) ABSTRACT

A buckle for a child safety seat harness having a base part and a latch part, the latch part having a releasable latching mechanism that includes a plurality of magnetic elements arranged to urge the base and latch parts into engagement during a connection operation and to urge the base and latch parts apart during a disconnection operation that also releases the latch.

18 Claims, 17 Drawing Sheets

(56) References Cited

U.S. PATENT DOCUMENTS

| | | |
|---|---|---|
| 11,140,946 B2 | 10/2021 | Cheng |
| 2001/0025400 A1 | 10/2001 | Romca et al. |
| 2011/0006572 A1 | 1/2011 | Zhao |
| 2011/0133528 A1 | 6/2011 | Keith et al. |
| 2013/0015691 A1 | 1/2013 | Feng et al. |
| 2013/0285424 A1 | 10/2013 | Gardner |
| 2014/0339232 A1* | 11/2014 | Fiedler ................ E05B 47/0038 220/348 |
| 2020/0237116 A1* | 7/2020 | Yabuuchi ................ B62B 7/006 |
| 2021/0076784 A1 | 3/2021 | Cheng |
| 2021/0267319 A1 | 9/2021 | Cheng |
| 2022/0000222 A1 | 1/2022 | Cheng |

\* cited by examiner

MAGNETIC SHOULDER HARNESS BUCKLE FOR A CHILD RESTRAINT

CROSS-REFERENCE TO RELATED APPLICATIONS

This application claims the benefit of priority of U.S. Provisional Application 63/293,325 filed Dec. 23, 2021.

BACKGROUND OF THE INVENTION

Restraint belts in child safety seats typically comprise a pair of lap belt portions, a crotch belt, and a pair of shoulder belt portions all centrally connected in front of the child's abdomen to hold the child in place. Additional security for the infant child is commonly provided by adding an additional connection between the shoulder belt portions adjacent to the child's chest.

Most harness belt connectors are in addition to a primary connector which must be operated to secure the infant child in the seat or removing the infant child therefrom. Many harness belt connectors require caregivers to either engage the connector on one of the shoulder harness straps or operate complex connectors to join or separate the adjacent harness straps. These complex actions often require two hands to operate. This requirement is further complicates the task of moving an infant into or out of the seat, especially if the infant is moving or resisting the caregiver.

An improved harness buckle configured to be connected or disconnected easily using only one hand that provides a strong, secure connection when connection would be of great benefit. Additional benefits would be realized by a harness buckle that includes means for urging the buckle portions together or apart during the connecting/disconnection operations to further ease the task of operating the buckle with a single hand.

SUMMARY OF THE INVENTION

Accordingly, the present invention, in any of the embodiments described herein, may provide one or more of the following advantages:

It is an object of the present invention to provide a buckle for a child safety seat harness comprising a base part and a latch part and a releasable latching mechanism disposed on the latch part that includes a plurality of magnetic elements arranged to urge the base part and the latch part into engagement during the connection operation and to urge the base part and the latch part apart during the disconnection operation. The latching mechanism comprises a moveable slide part having two magnetic elements with opposite polarity arranged to interact with a third magnetic element disposed on the base part wherein the magnetic elements on the magnetic slide are individually aligned with the third magnetic element to attract or repel dependent upon the position of the slide part.

It is a further object of the present invention to provide a buckle for a child safety seat harness wherein the slide part of the releasable latching mechanism includes a magnetic slide and a catch slide, each arranged for bi-directional movement along parallel axes, the magnetic slide being normally urged toward a latched position by a first biasing element, the catch slide also being normally urged toward a latched position by a second biasing element, the biasing force of the first biasing element being substantially greater than the biasing force of the second biasing element.

It is a further object of the present invention to provide a buckle for a child safety seat harness comprising a releasable latching mechanism that provides for at least two latching interfaces between the base part and the latch part which increase the resistance to separation of the buckle when the buckle parts are connected, and the latching mechanism is engaged. The latching mechanism includes a bi-directionally moveable catch slide that is biased toward a latched position, the biasing element providing minimal biasing force so that the catch slide can be easily displaced to engage a catch structure as the buckle portions are moved into a connected configuration.

It is a still further object of the present invention to provide a buckle for a child safety seat comprising a base part and a latch part, the latch part having a releasable latching mechanism that includes a plurality of magnetic elements arranged to urge the base and latch parts into engagement during the connection operation and to urge the base and latch parts apart during the disconnection operation that is durable in construction, inexpensive of manufacture, carefree of maintenance, easily assembled, and simple and effective to use.

These and other objects are achieved in accordance with the present invention by a buckle for a child safety seat harness comprising a base part and a latch part, the latch part having a releasable latching mechanism that includes a plurality of magnetic elements arranged to urge the base and latch parts into engagement during the connection operation and to urge the base and latch parts apart during the disconnection operation. The buckle includes a magnetic slide and a catch slide, each arranged for bi-directional movement along parallel axes, the magnetic slide being normally urged toward a latched position by a first biasing element, the catch slide also being normally urged toward a latched position by a second biasing element, the biasing force of the first biasing element being substantially greater than the biasing force of the second biasing element and the sliding displacement of the magnetic slide being greater than the sliding displacement of the catch slide.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Figure 1:
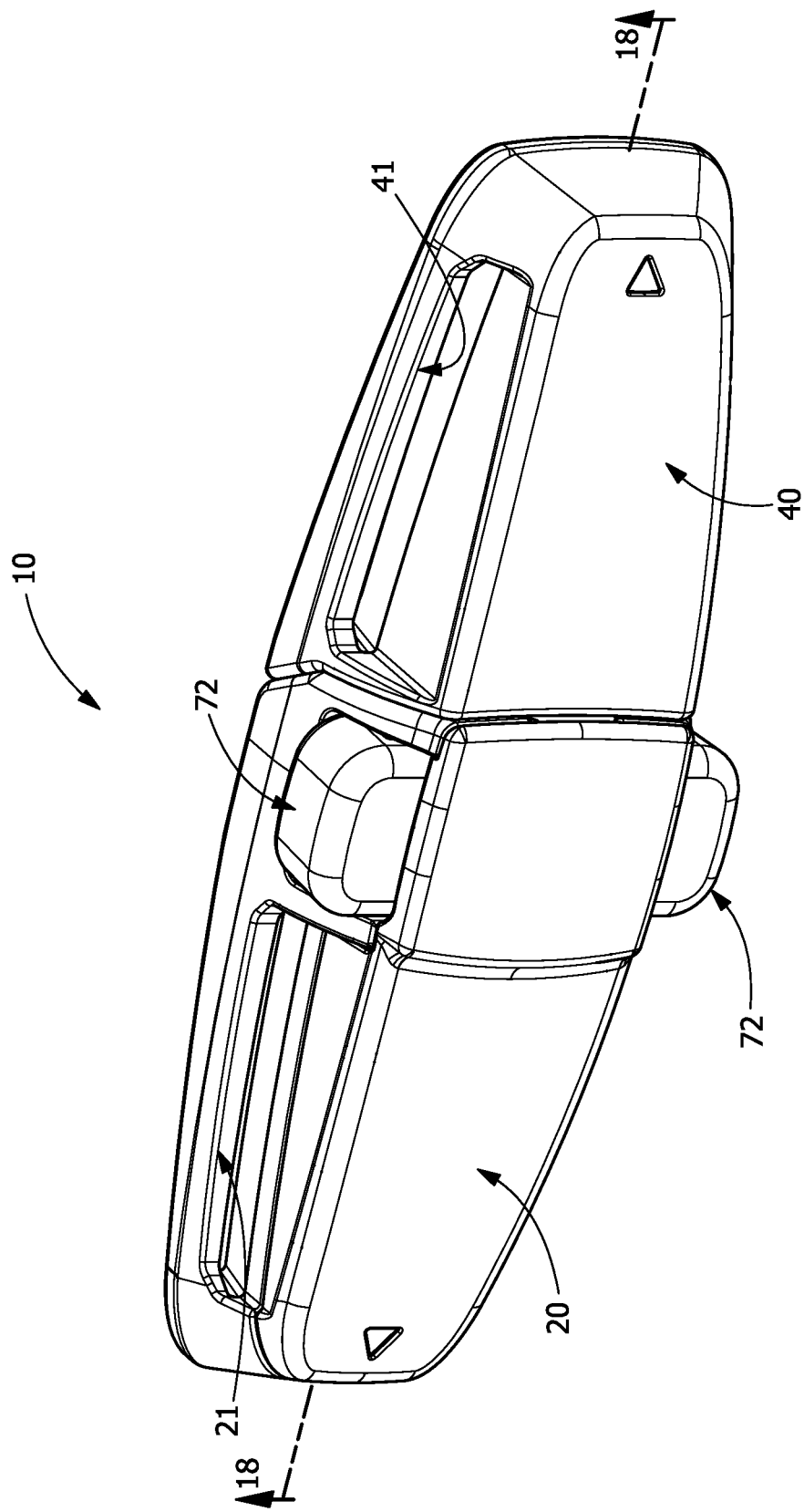
FIG. 1 illustrates a first embodiment of a harness belt buckle useful for a child safety seat shown in the engaged and latched position suited for use.
Figure 2:
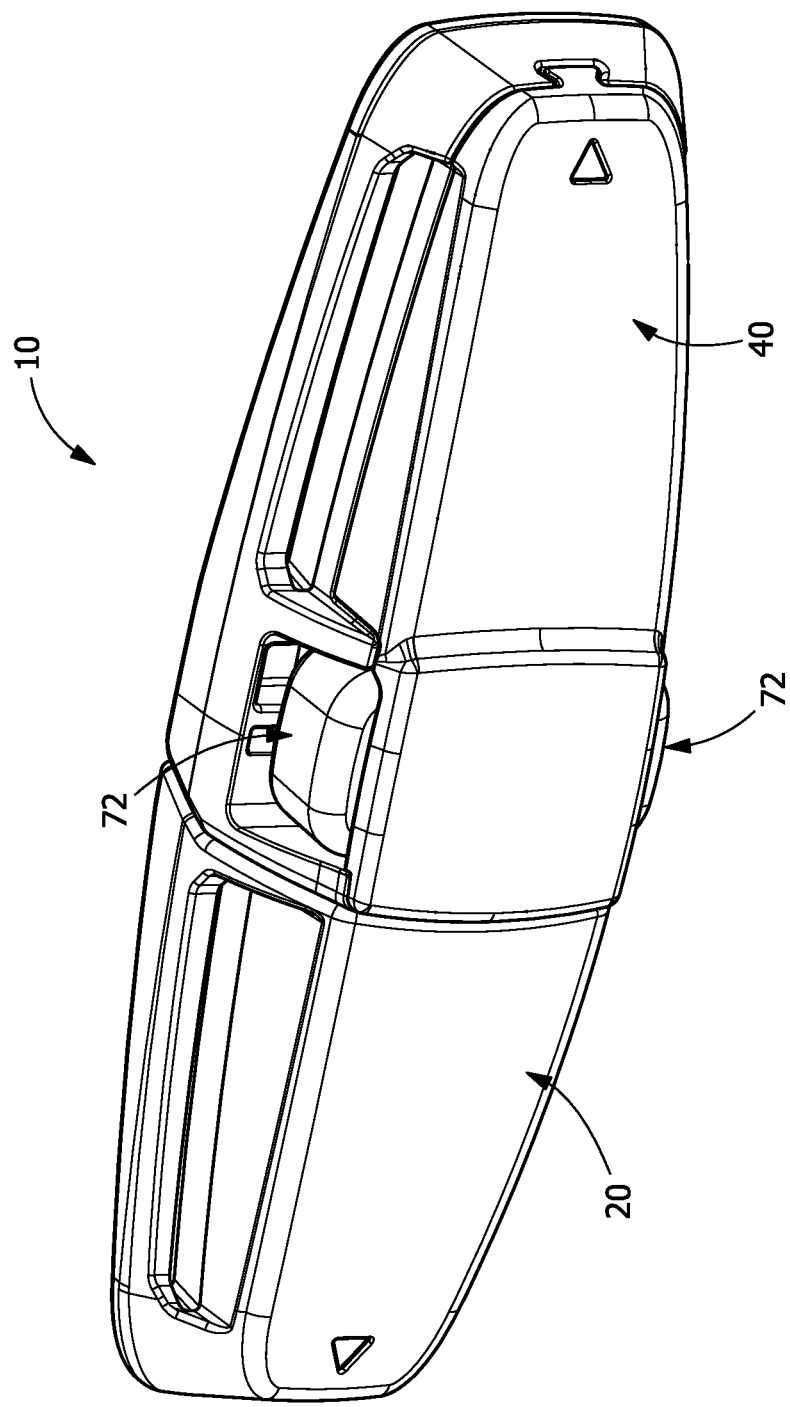
FIG. 2 is a view of the harness belt buckle of FIG. 1 wherein the release actuator is shown in the disengaged position in preparation to uncouple the buckle.
Figure 3:
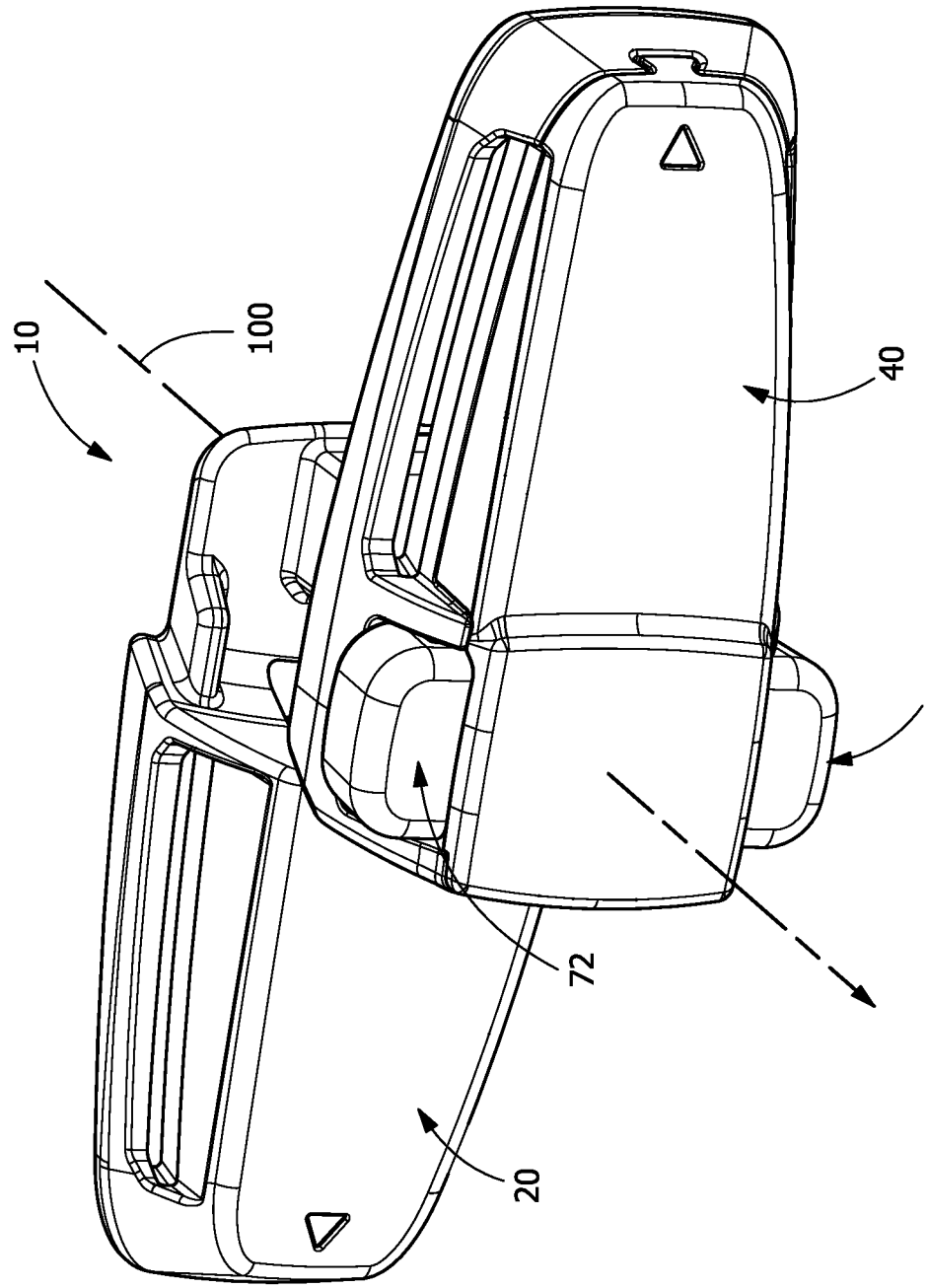
FIG. 3 is a view of the harness belt buckle of FIG. 2 wherein the buckle portions are separated.
Figure 4:
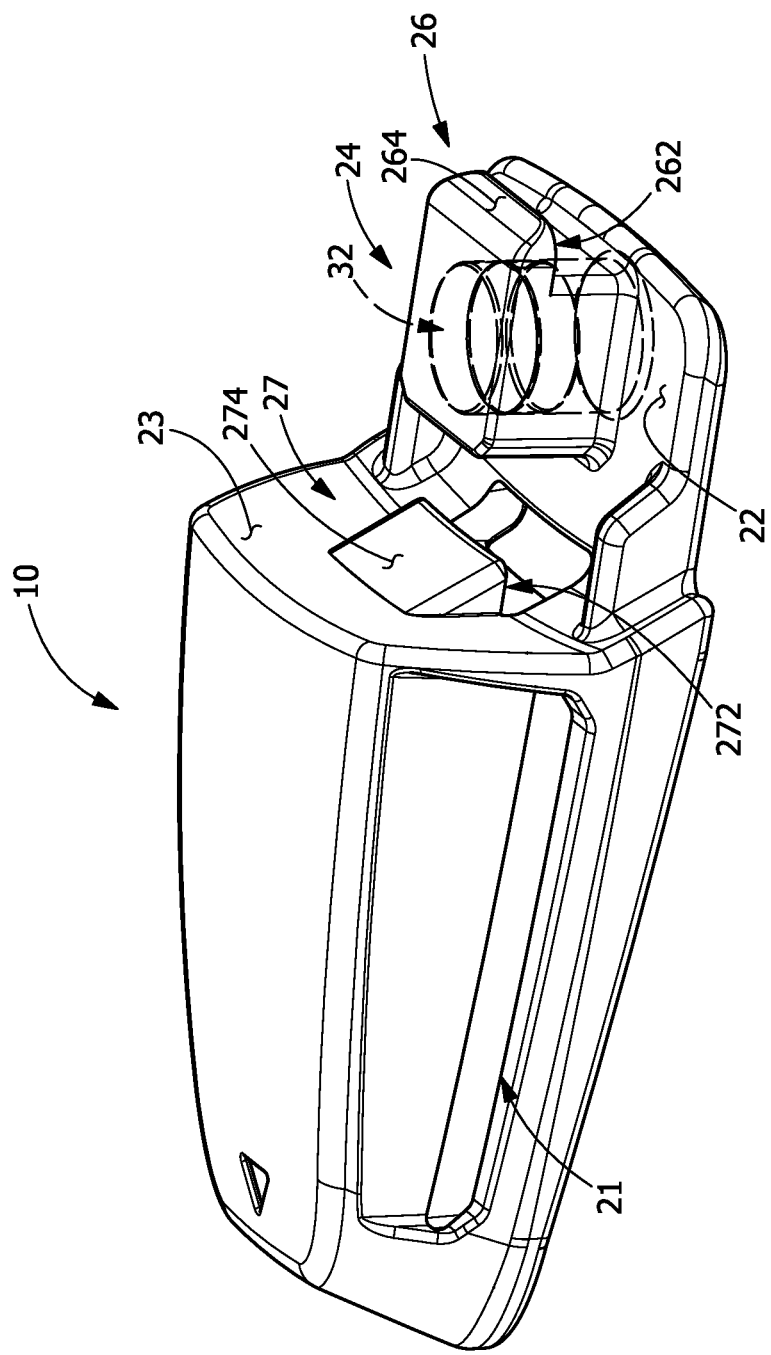
FIG. 4 is a partial view of the harness belt buckle of FIG. 1 showing the base part of the buckle.
Figure 5:
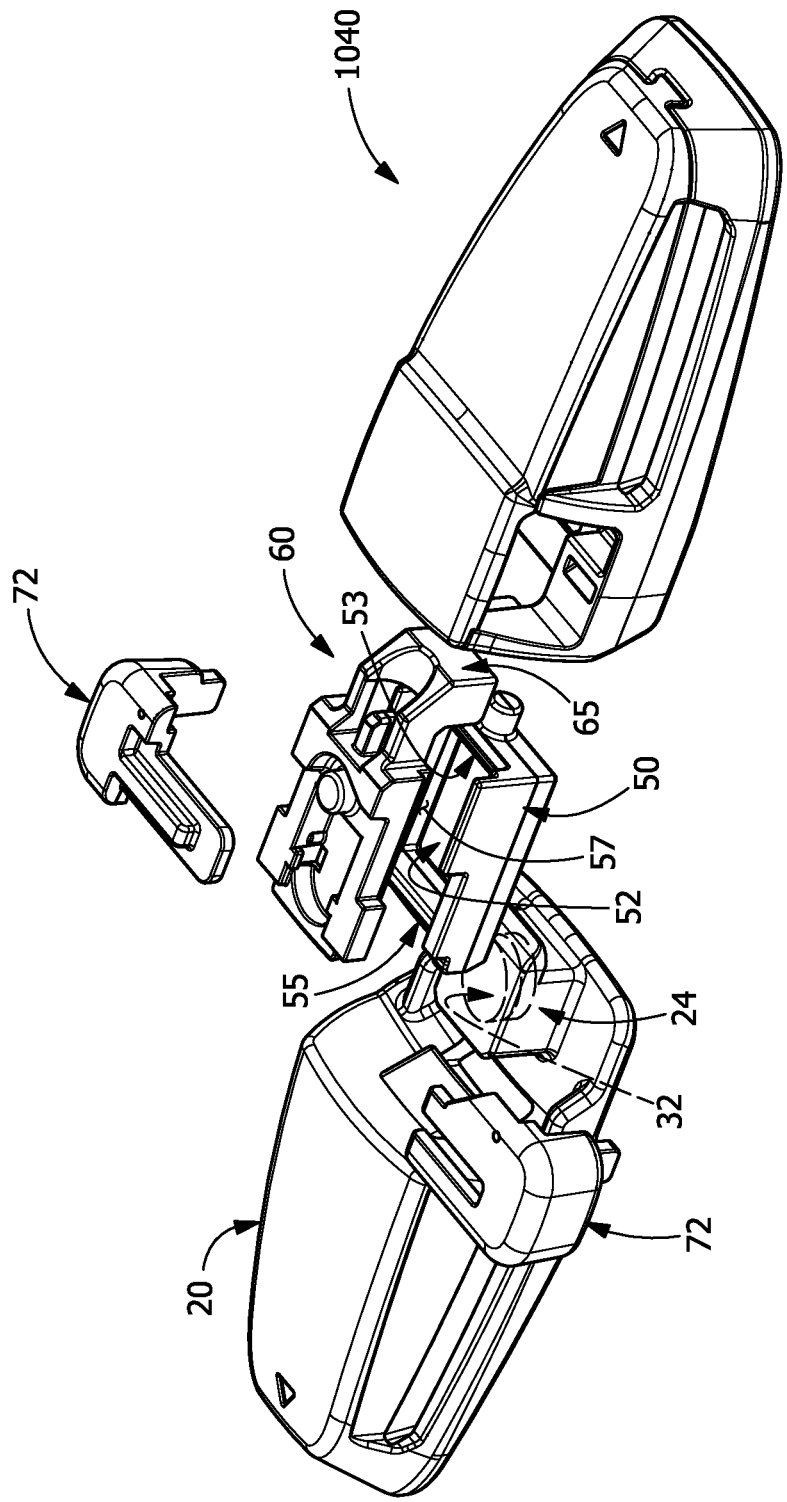
FIG. 5 is a partial exploded view of the harness belt buckle of FIG. 1.
Figure 6:
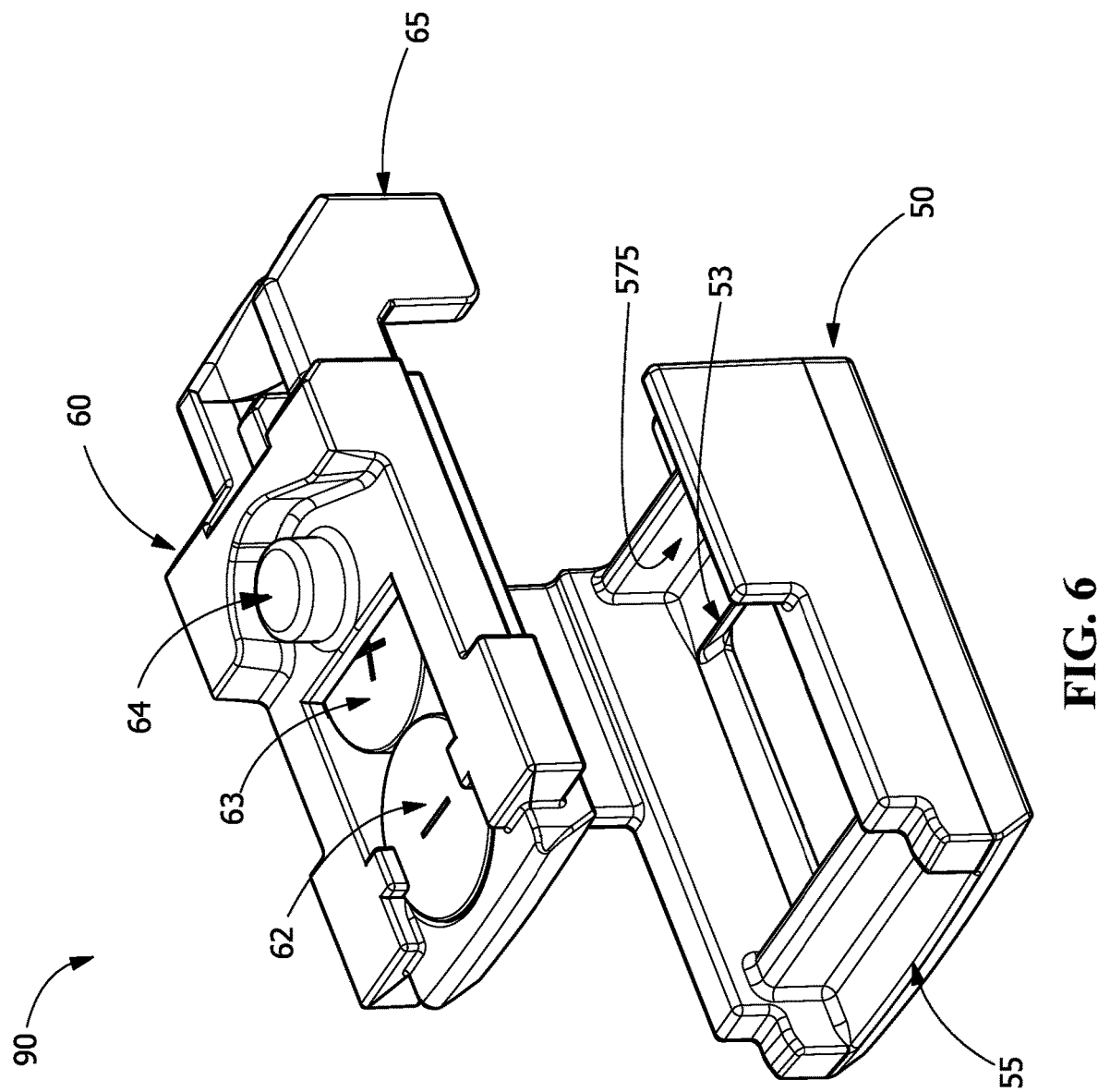
FIG. 6 is a top perspective view of the slide assembly magnetic slide and catch slide.
Figure 7:
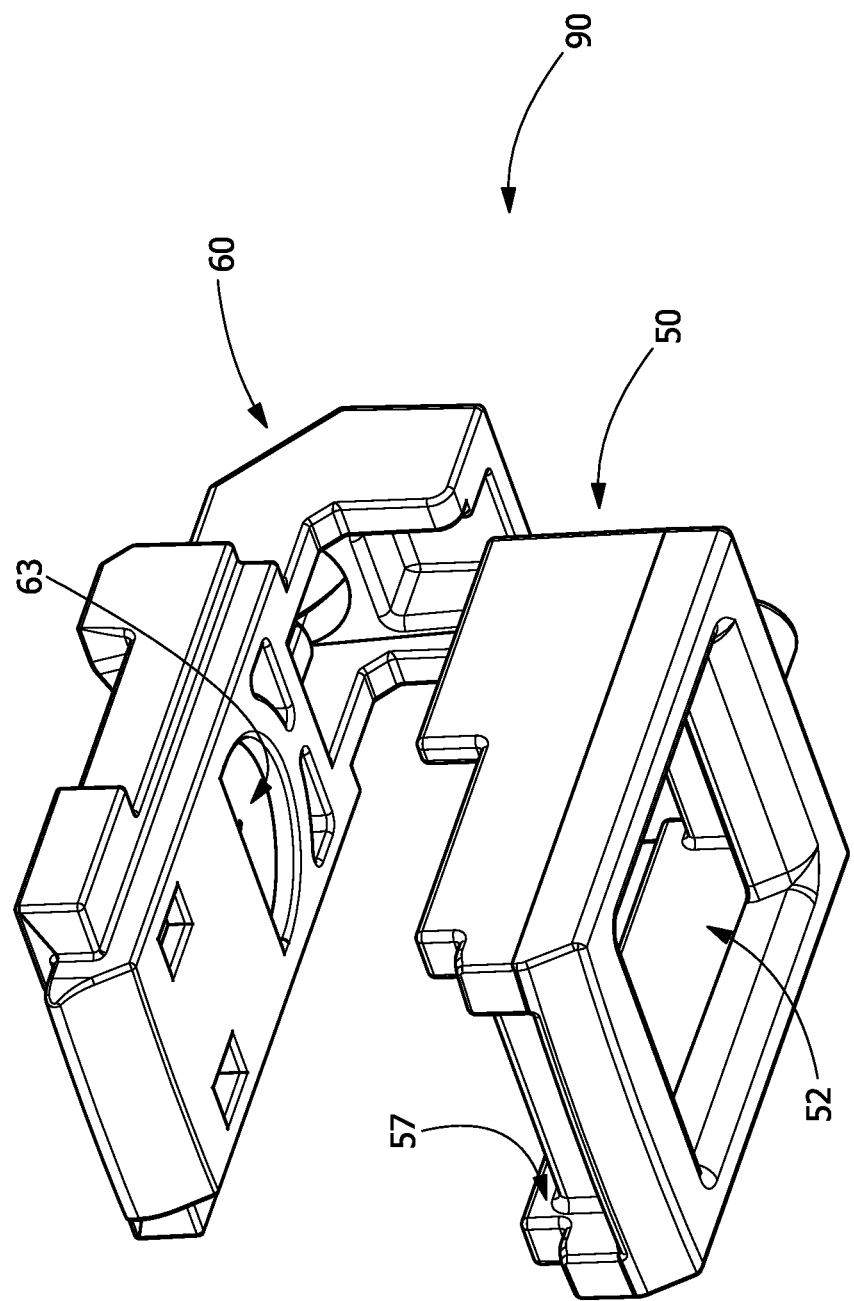
FIG. 7 is a bottom perspective view of the slide assembly magnetic slide and catch slide shown in FIG. 6.
Figure 8:
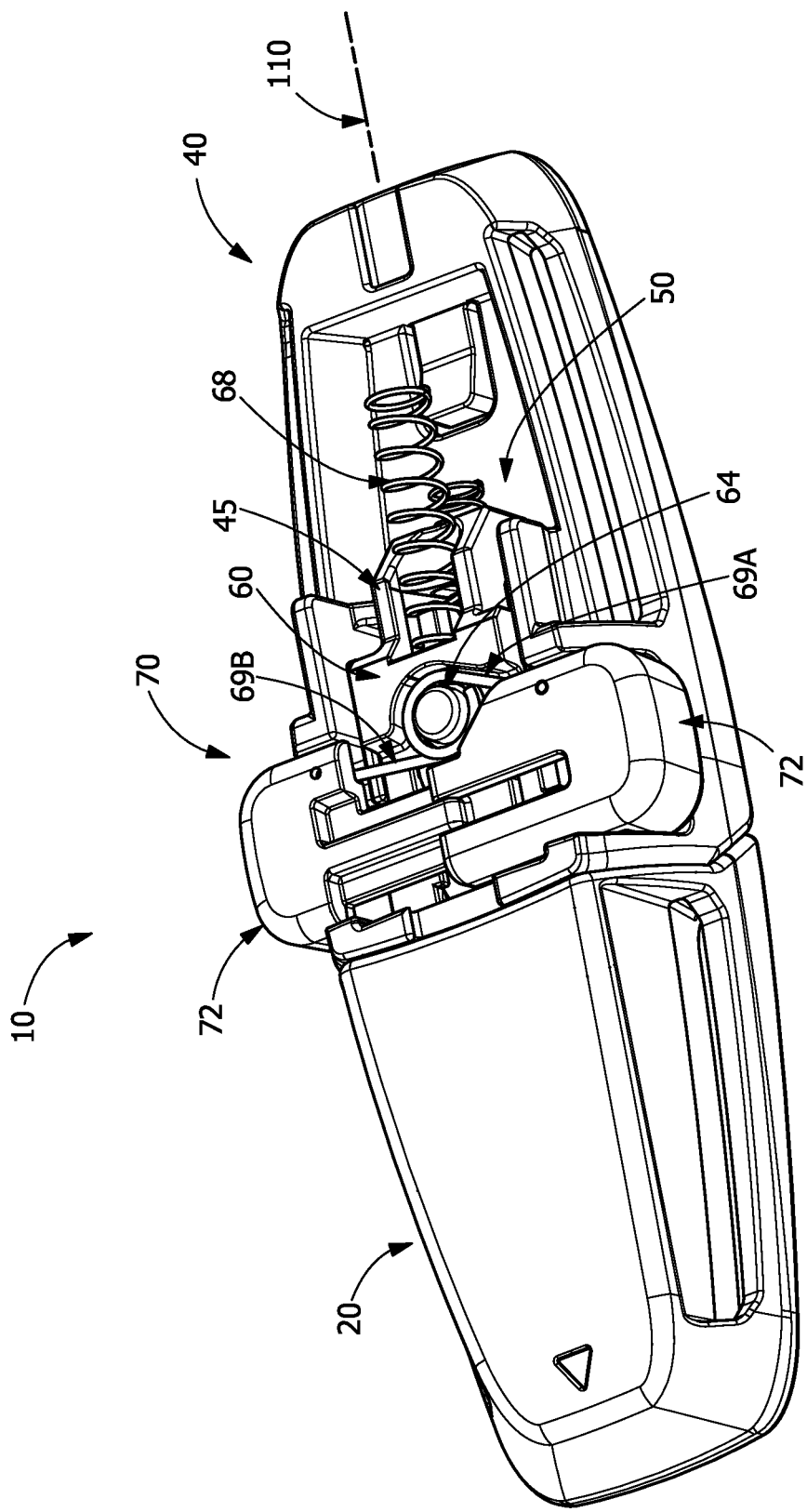
FIG. 8 is a partial view of the latching mechanism of the harness belt buckle of FIG. 1 shown in the engaged and latched position.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "up" or "down," or "top" or "bottom" are used as a matter of mere convenience, and are determined with reference to harness buckle as it would normally rest on a level surface. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Referring to FIGS. 1 through 12, and 18, a first embodiment of a shoulder harness buckle assembly 10 is presented. The shoulder harness buckle assembly 10 comprises a base part 20 and a latch part 40, each configured for with openings 21, 41 to slidingly receive respective right and left shoulder harness straps in a manner allowing vertical adjustment of the buckle assembly on the straps when in use. Operably connecting the base and latch parts joins the straps and inhibits lateral separation thereof and improves restraining capability of the harness.

In one embodiment the base part 20 includes base surface 22 having a post 24 extending upwardly therefrom and an adjacent backstop structure 23 spaced apart from the post. A first fixing flange 26 extends outwardly from a side surface the post. A second fixing flange 27 extends outwardly from a surface of the backstop structure. The fixing flanges are each arranged to extend in the same direction from their respective surfaces and are both spaced apart from the base surface. The fixing flanges each include a locking surface 262, 272 and a guiding surface 264, 274.

A first magnetic element 32 is disposed in a distal end of the post. The first magnetic element has a first polarity that is aligned to magnetically attract or repel other magnetic elements adjacently positioned, the magnetic forces acting along an axis generally perpendicularly to the base surface.

The latch part 40 includes a base surface 42 and an opening 44 through which the post 24 of the base part may be received by relative motion generally perpendicular to the respective base planes of the base and latch parts, referred to as an engagement axis 100. The latch part 40 further includes a first guide structure 45 proximate to the opening configured to constrain motion of a slide assembly 90 to bi-directionally along a slide axis 110 between opposing latched (FIG. 9) and unlatched (FIG. 10) positions and allow the slide assembly to interact with the post structure engaged in the opening. Slide axis 110 is generally longitudinally aligned with the buckle assembly 10. Slide assembly 90 is configured to selectively engage fixing flanges 26, 27 on the base part to operably connect the latching portion to the base part when the slide assembly is in the latched position. Displacing the slide assembly to the unlatched position allows the base part to the separated from the latch part to facilitate separation of harness straps for removal of an infant occupant from the safety seat.

Slide assembly 90 may comprise a catch slide 50, a magnetic slide 60, and an actuator 70 for selectively releasing the harness buckle assembly 10 so that the base part 20 and latch part 40 may be separated. Catch slide 50 is configured to retain the base and latch parts connected when the buckle assembly is operably connected. Magnetic slide 60 is configured to move the catch slide in a releasing direction to permit separation of the base and latch parts, and to reposition magnetic elements contained therein to either attract or repel the first magnetic element, dependent upon the position of the magnetic slide. Catch slide 50 and magnetic slide 60 are moveable in relation to one another. Resilient elements are provided to bias both slides toward their respective latched/engaged positions.

In one embodiment, catch slide 50 is configured with an opening 52 through which post 24 may be extended and includes first and second catch structures 53, 55 that are configured to matingly engage the first and second fixing flange locking surfaces 262, 272 when the catch slide 50 is in the latched position, the first and second catch structures 53, 55 disengaging the first and second fixing flange locking surfaces 262, 272 when the catch slide is moved toward the unlatched position. A first resilient element 58 is provided to bias the position of the catch slide 50 toward the latched position while allowing catch slide movement toward the unlatched position as the base and latch parts 20, 40 of the buckle are moved toward a connected configuration, displacement of the catch slide 50 caused by contact between the catch structures 53, 55 and the engaging guide structures 264, 274 on the fixing flanges 26, 27 and the buckle portions are moved into engagement. The first resilient element is configured with a relatively low spring rate compared to the spring rate of the second resilient element to minimize resistive force when engaging the latch parts.

In one embodiment fixing flanges 26, 27 may be oriented laterally from the post 24 and the first and second catch structures 53, 55 on the catch slide 50 be configured to engage the lateral sides of the post. This configuration may be less ideal as greater displacement of the catch slide 50 is necessary to fully disengage the latch assembly and the buckle bending strength, when latched, is reduced compared to other catch structure orientations.

Figure 9:
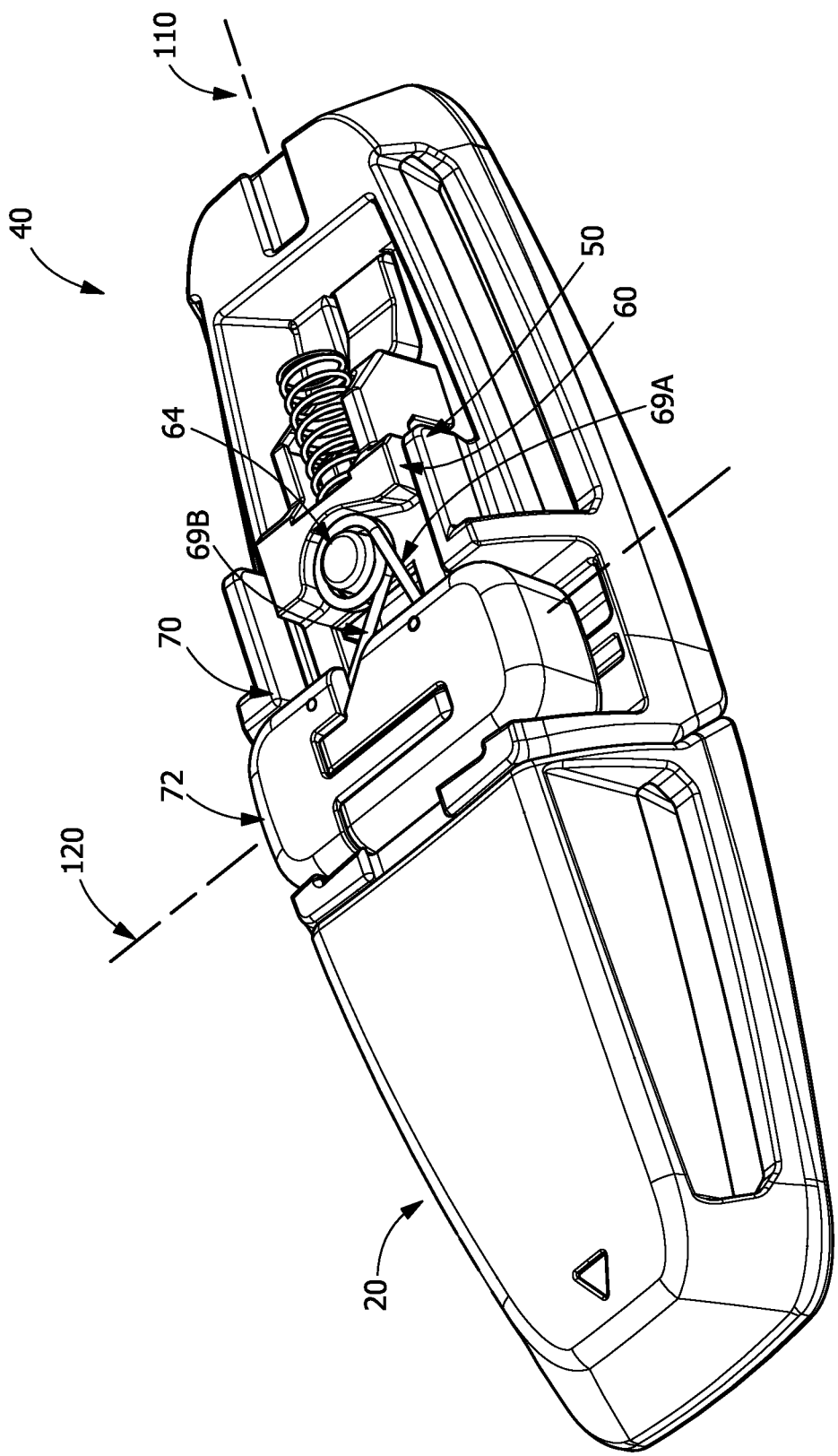
FIG. 9 is a partial view of the latching mechanism of the harness belt buckle of FIG. 2 shown in the disengaged position.
Figure 10:
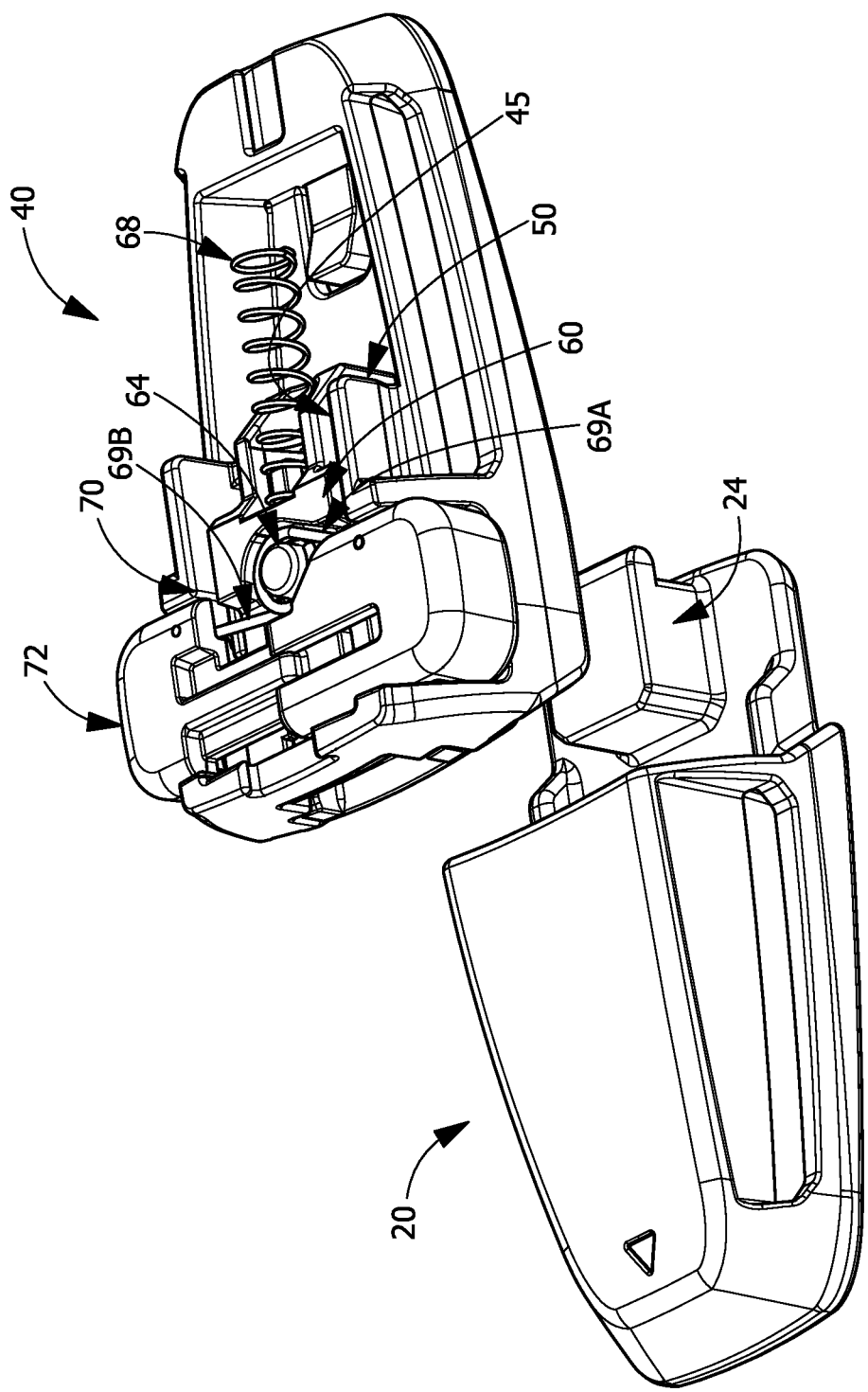
FIG. 10 is a partial view of the latching mechanism of the harness buckle of FIG. 3 shown with the buckle portions separated.

The catch slide 50 may include a second guide structure 57 which constrains motion of a magnetic slide 60 to bi-directional in a plane parallel to the base plane between opposing engaging (FIG. 8) and releasing positions (FIG. 9). A driving structure 65 on the magnetic slide engages ends of the second guide structure 57 in a manner limiting movement of the magnetic slide that may occur without corresponding movement of the catch slide within the first guide structure 45. Once the driving structure 65 contacts a driving end 575 of the latch guide structure, continued movement of the magnetic slide also causes the catch slide to move.

The magnetic slide 60 includes a second magnetic element 62 and a third magnetic element 63. The second and third magnetic elements 62, 63 have second and third polarities, respectively, aligned to act generally perpendicularly to the base plane. The first and second polarities are configured to create an attractive force between the magnetic elements while the first and third polarities are configured to create a repulsive force between the magnetic elements. These are illustrated with "+" and "−" symbols on the respective magnetic elements in the figures.

A second resilient element 68 is provided to bias the magnetic slide toward the engaging position. The second resilient element is configured with a relatively high spring rate compared to the spring rate of the first resilient element to minimize the likelihood of an accidental release of the buckle. An actuator 70 is provided to act on the magnetic slide 60 to selectively urge it toward the releasing position. Initial movement of the magnetic slide toward the releasing position does not result in movement of the catch slide as the magnetic slide moves within the limits of the second guide structure 57. Once the travel limiter 65 of the magnetic slide contacts the end 575 of the second guide structure 57, continued movement of the actuator 70 acting on the magnetic slide 60 causes the catch slide 50 to begin moving from the latched position toward the unlatched position. The initial movement of the magnetic slide is necessary to realign the magnetic elements which requires greater slide displacement in relation to the latch part than does the catch slide to disengage the catch structures 53, 55 from the post fixing flanges 26, 27.

When the magnetic slide 60 is positioned in the engaged position, attractive forces between the first magnetic element 32 located in the post 24 and the second magnetic element 62 located in the magnetic slide 60 draw the post into the opening 44 of the latch part along the engagement axis 100 to engage the harness buckle. As the post 24 enters the opening 44, the catch slide 50 is momentarily displaced to allow engagement of the fixing flanges with the catch surfaces. Once engaged, reverse movement of the post 24 along the engagement axis 100 to withdraw it from the opening 44 is precluded thereby retaining latch part 40 secured to base part 20.

When releasing the harness buckle, the magnetic slide 60 is shifted by the actuator 70 toward the disengaged position. As the magnetic slide begins moving, the second magnetic 62 element is moved from alignment with the first magnetic element 32 thereby reducing the attractive force. The third magnetic element 63 is positioned on the magnetic slide 60 adjacent to the second magnetic element and is simultaneously moved toward alignment with the first magnetic element 32 as the magnetic slide moves. As the first and third magnetic elements begin to move into a magnetically repelling alignment, the magnetic slide 60 reaches the limit of the second guide structure 57. Continued movement of the magnetic slide 60 from this intermediate position via the actuator 70 causes the catch slide 50 to move from the latched position toward the unlatched position. As the catch slide 50 moves, the catch structures 53, 55 and the post fixing flanges 26, 27 move out of engagement thereby allowing disengaging movement of the post 24 along the engagement axis 100. The repelling force between the first and third magnetic elements urges the post, once the catch surfaces and the engaging structures are disengaged, out of the opening in the latch part thereby separating the latch part from the base part and disconnecting the harness buckle.

Figure 11:
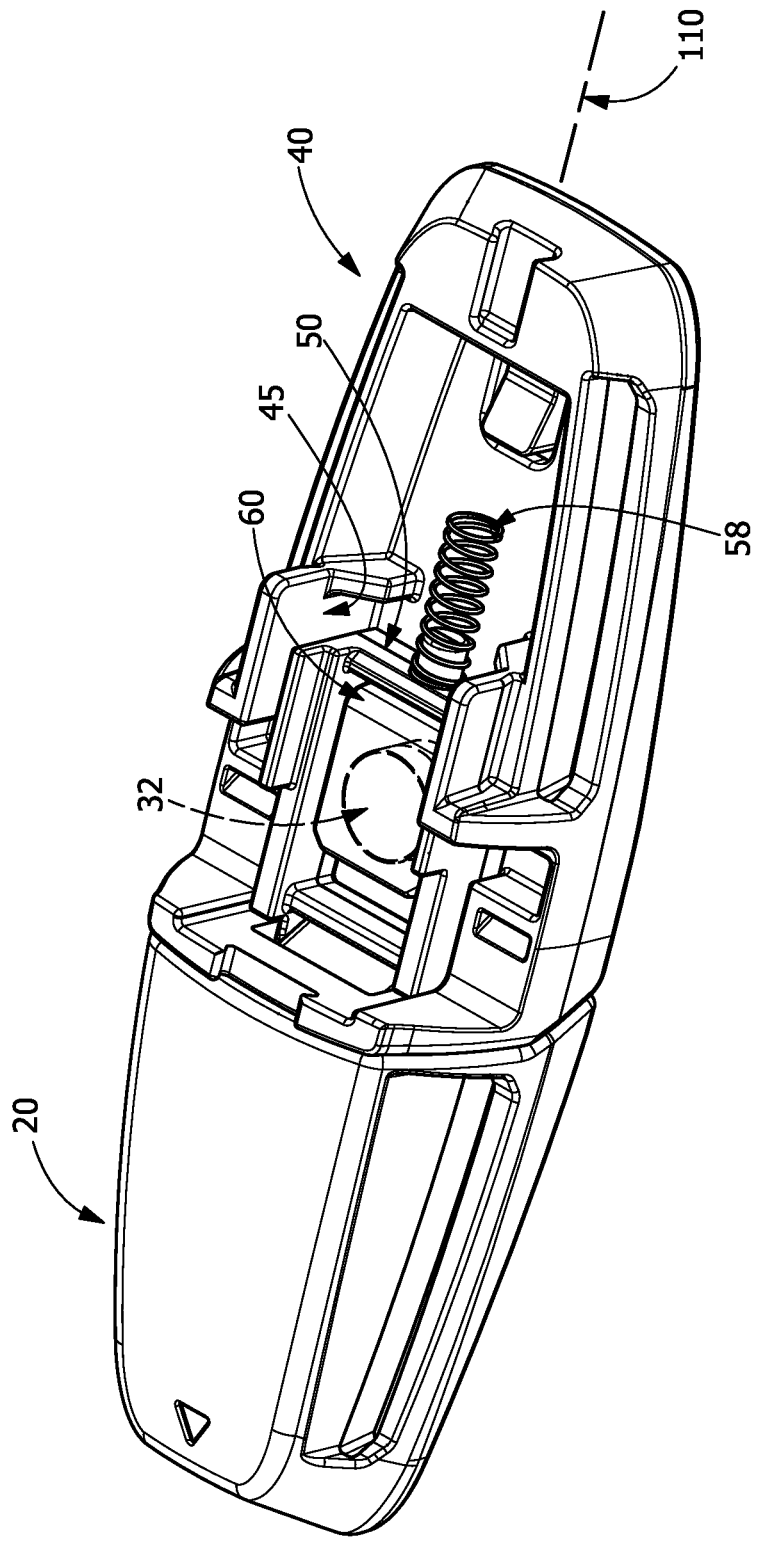
FIG. 11 is a partial view of the internals of the latching mechanism as positioned in FIG. 8.
Figure 12:
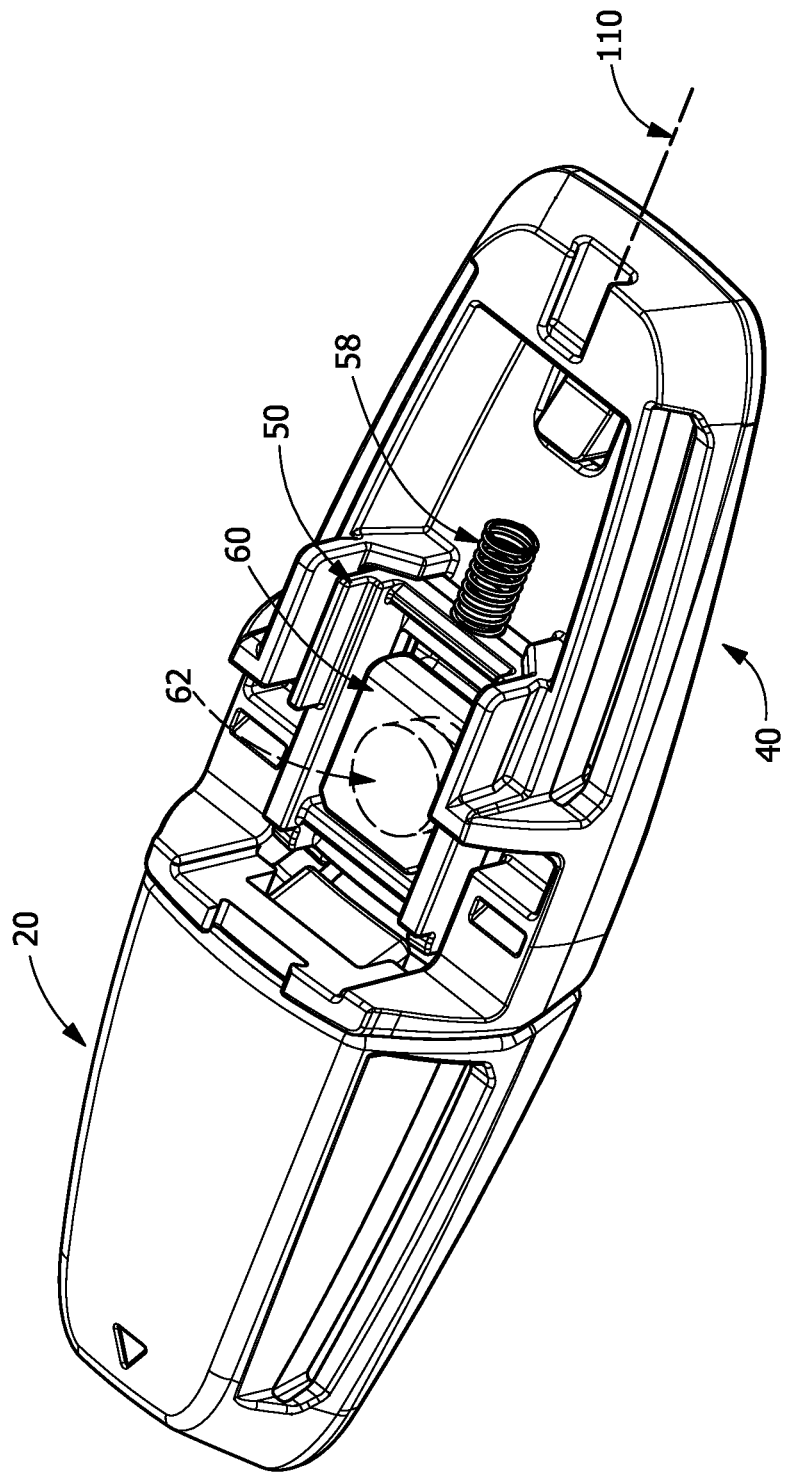
FIG. 12 is a partial view of the internals of the latching mechanism as positioned in FIG. 9.

FIGS. 11 and 12 provide a view of the base surface 42 of the latch part 40 showing the relative positioning of the second and third magnetic elements 62, 63 as the magnetic slide 60 is displaced.

One embodiment of the actuator 70 includes a pair of opposing release buttons 72, each moveable along a first actuator axis 120 that is perpendicular to the axis along with the magnetic slide moves. Pressing the release buttons 72 inwardly urges the magnetic slide 60 to displace it from the engaged position. Motion of the release buttons 72 may be transferred to the magnetic slide by a cam arrangement or a linkage. In the illustrated embodiment, inward movement of release buttons 72 acts upon the link elements 69A, 69B which are anchored to magnetic slid 60 at post 64. The free ends engage the respective release buttons while coiled end of the link element encircle post 64. Inward displacement of the free ends of link elements 69A, 69B by release button 72 forces post 64 rearwardly toward the disengaged position, acting against the bias force of second resilient member 68 to release the buckle. In another embodiment, link elements 69A, 69B are joined at the loop encircling post 64 to form a torsion spring configured to bias release buttons 72 outwardly. Inward displacement of the release buttons forces the coiled portion rearwardly to displace the magnetic slide. The arrangement of the torsion spring also provides a biasing force on the magnetic slide similar to that provided by the second resilient member 68, allowing the torsion spring to function as the second resilient member 68.

Figure 13:
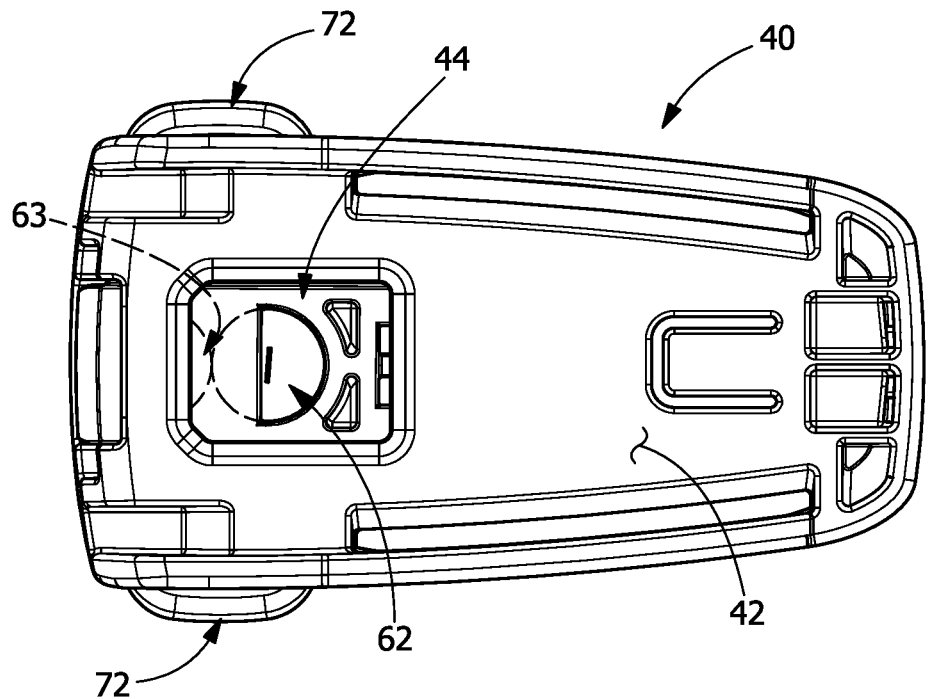
FIG. 13 is a view of the bottom side of the latching portion of the buckle as positioned in the engaged and latched position of FIG. 8.
Figure 14:
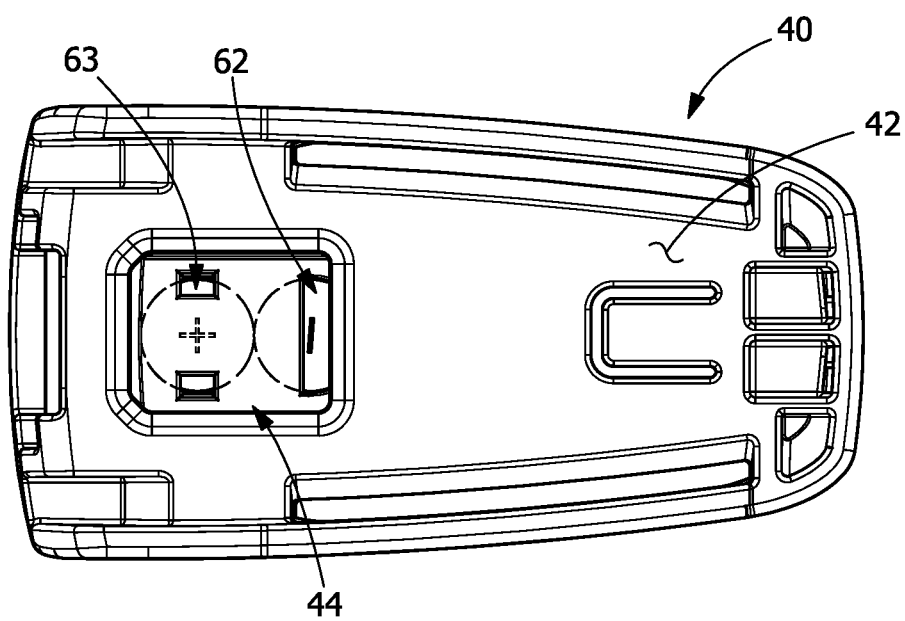
FIG. 14 is a view of the bottom side of the latching portion of the buckle as positioned in the disengaged position of FIG. 9.
Figure 15:
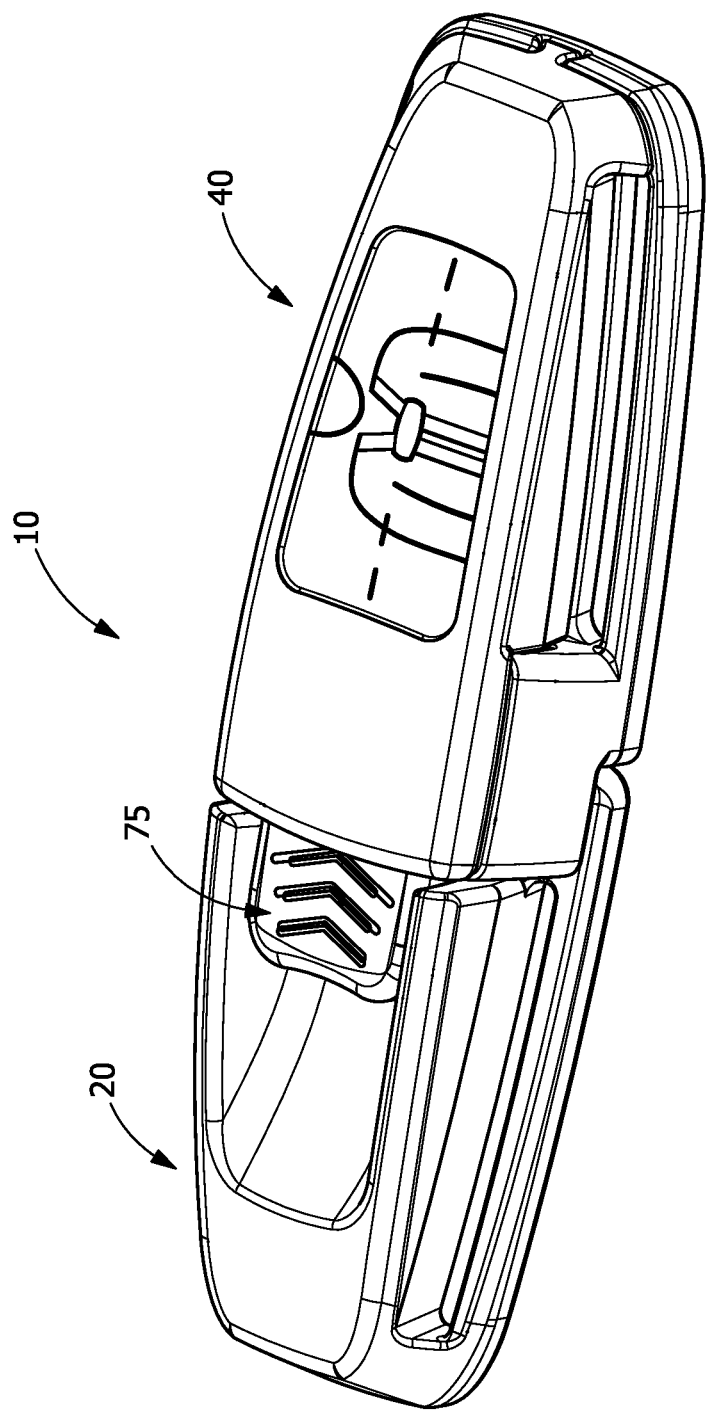
FIG. 15 illustrates a second embodiment of a harness belt buckle useful for a child safety seat shown in the engaged and latched position suited for use.
Figure 16:
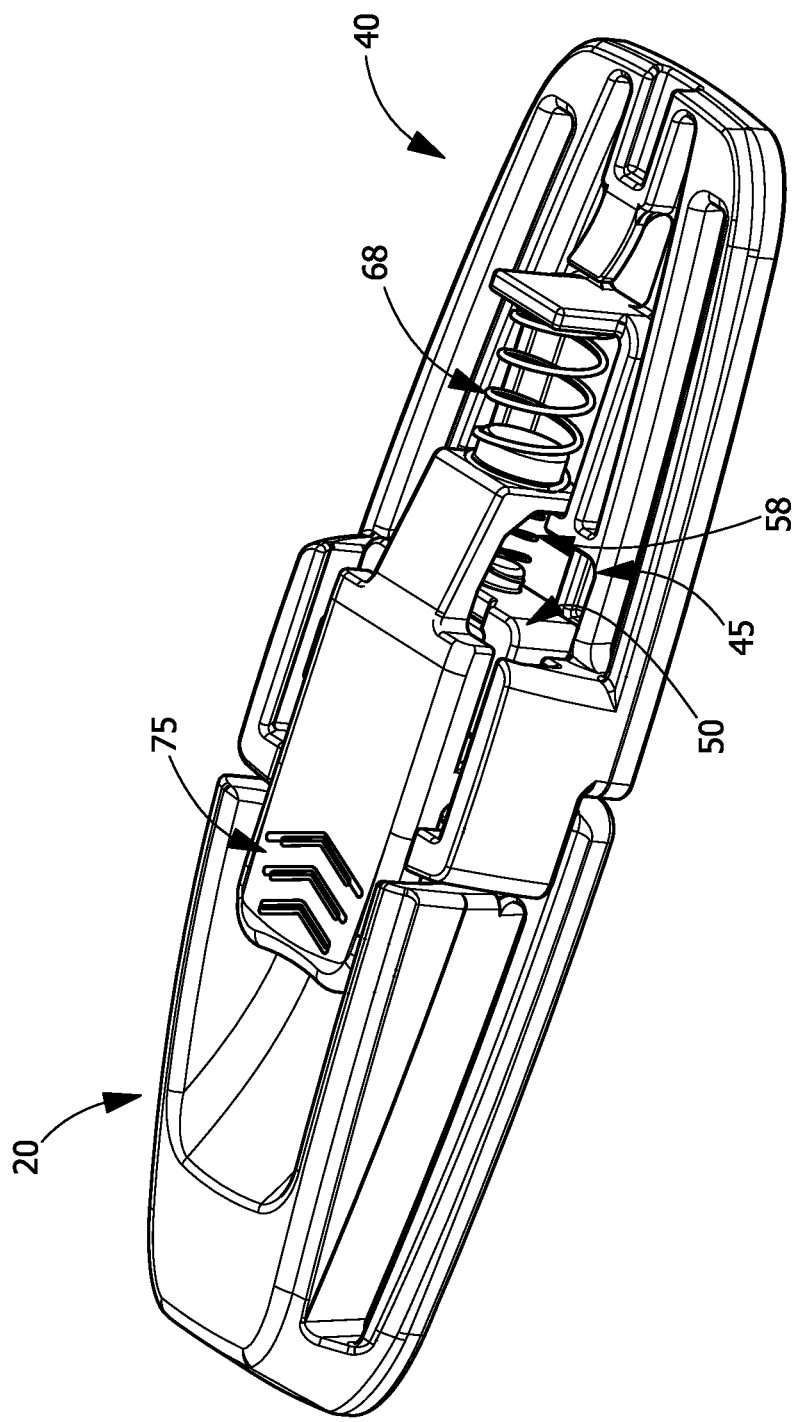
FIGS. 16 and 17 are partial internal views of the harness belt buckle of FIG. 15.
Figure 17:
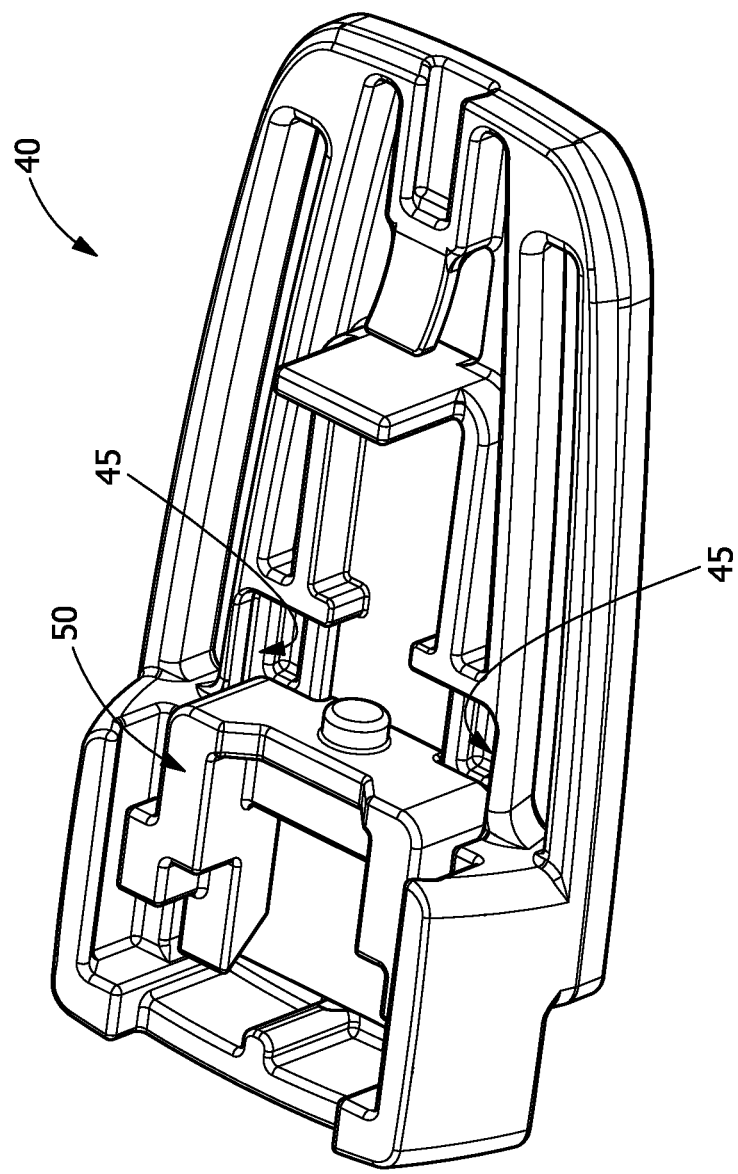
Figure 18:
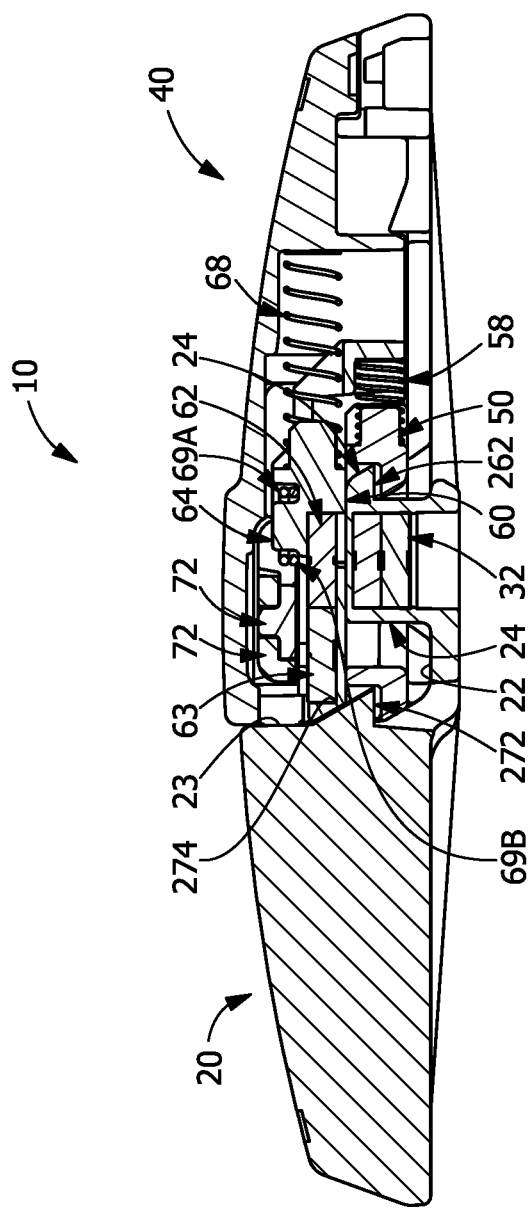
FIG. 18 is a section view of the harness belt buckle shown in FIG. 1 taken along section line 18-18.

Another embodiment of the actuator shown in FIGS. 13 through 15, an actuator release button 75 may be configured for movement along the same axis as the magnetic slide. The release button may be a separate construct from the magnetic slide, or it may be integral to the magnetic slide structure. Pressing or pushing the release button causes the magnetic slide to move from its engaged position toward the disengaged position and eventually leads to displacement of the catch slide as described above.

Naturally, the invention is not limited to the foregoing embodiments, but it can also be modified in many ways without departing from the basic concepts. Changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A buckle for a harness used in a child safety seat comprising:
   a base part having a first magnetic element;
   a latch part configured to engage the base part; and
   a slide part having a second magnetic element and a third magnetic element moveably connected to the latch part and moveable between opposing latched and unlatched positions, movement of the slide part to the latched position aligning the first magnetic element and the second magnetic element in a magnetically attracting configuration to attract the latch part into engagement with the base part, movement of the slide part to the unlatched position aligning the first magnetic element and the third magnetic element into a magnetically repelling configuration to urge the latch part out of engagement with the base part;

wherein the base part further comprises a flange engageable by a portion of the slide part when in the latched position to retain the latch part engageably connected to the base part; and wherein the slide part further comprises a catch slide and a magnetic slide, the catch slide being bi-directionally moveable along a slide axis between the latched and unlatched positions and configured to engage a flange on the base part to retain the latch part in engagement with the base part when the catch slide is in the latched position, a first resilient member being provided to bias the catch slide toward the latched position, the magnetic slide being bi-directionally moveable relative to the catch slide in a direction parallel to the slide axis between engaging and releasing positions, a second resilient member being provided to bias the magnetic slide toward the engaging position, the catch slide configured so that continued movement of the magnetic slide in the direction toward the releasing position causes movement of the catch slide toward the unlatched position.

2. The buckle of claim 1, wherein the latch part is configured with a first guide structure configured to limit movement of the catch slide to bidirectional along the slide axis between the latched and unlatched positions, and the catch slide is configured with a second guide structure configured to limit movement of the magnetic slide to bidirectional along the slide axis between the engaging and releasing positions.

3. The buckle of claim 2, wherein the magnetic slide includes a driving structure configured to engage a driving end in the catch slide as the magnetic slide is moved out of the engaging position toward the releasing position and move the catch slide out of the latched position.

4. The buckle of claim 3, further comprising an actuator configured to selectively move the magnetic slide from the engaging position to the releasing position.

5. The buckle of claim 4, wherein the second resilient element has a higher spring rate than the first resilient element.

6. The buckle of claim 5, wherein displacement of the magnetic slide between the engaging and releasing position is greater than displacement of the catch slide between the latched and unlatched position.

7. A buckle for a harness used in a child safety seat comprising:
a base part having a first magnetic element;
a latch part configured to engage the base part; and
a slide part having a second magnetic element and a third magnetic element moveably connected to the latch part and moveable between opposing latched and unlatched positions, movement of the slide part to the latched position aligning the first magnetic element and the second magnetic element in a magnetically attracting configuration to attract the latch part into engagement with the base part, movement of the slide part to the unlatched position aligning the first magnetic element and the third magnetic element into a magnetically repelling configuration to urge the latch part out of engagement with the base part;
wherein the base part further comprises a flange engageable by a portion of the slide part when in the latched position to retain the latch part engageably connected to the base part and a post structure;
wherein the latch part includes an opening configured to receive a portion of the post structure, the first magnetic element being disposed in a distal end of the post structure, movement of the slide part toward the latched position engaging the post structure to retain the latch part connected to the base part; and
wherein the flange comprises a first flange portion disposed on the post structure and a second flange portion disposed on the base part adjacent to the post structure, the slide part further comprising a first catch portion and a second catch portion, the first and second catch portions simultaneously engaging respective first and second flange portions when the slide assembly part is in the latched position.

8. The buckle of claim 7, wherein the slide part comprises a catch slide and a magnetic slide, the catch slide being bi-directionally moveable along a slide axis between the latched and unlatched positions and configured to engage a flange on the base part to retain the latch part in engagement with the base part when the catch slide is in the latched position, a first resilient member being provided to bias the catch slide toward the latched position, the magnetic slide being bi-directionally moveable relative to the catch slide in a direction parallel to the slide axis between engaging and releasing positions, a second resilient member being provided to bias the magnetic slide toward the engaging position, the catch slide configured so that continued movement of the magnetic slide in the direction toward the releasing position causes movement of the catch slide toward the unlatched position.

9. The buckle of claim 8, wherein the latch part is configured with a first guide structure configured to limit movement of the catch slide to bidirectional along the slide axis between the latched and unlatched positions, and the catch slide is configured with a second guide structure configured to limit movement of the magnetic slide to bidirectional along the slide axis between the engaging and releasing positions.

10. The buckle of claim 9, wherein the magnetic slide includes a driving structure configured to engage a driving end in the catch slide as the magnetic slide is moved out of the engaging position toward the releasing position and move the catch slide out of the latched position.

11. The buckle of claim 10, further comprising an actuator configured to selectively move the magnetic slide from the engaging position to the releasing position.

12. The buckle of claim 11, further comprising an actuator configured to selectively move the magnetic slide from the engaging position to the releasing position.

13. The buckle of claim 12, wherein displacement of the magnetic slide between the engaging and releasing position is greater than displacement of the catch slide between the latched and unlatched position.

14. The buckle of claim 13, wherein the slide part includes a catch engageable with the flange to retain the latch part in engagement with the base part when the slide part is latched.

15. The buckle of claim 14, wherein the slide part is bi-directionally moveable along a slide axis.

16. The buckle of claim 15, further comprising an actuator configured to selectively move the slide part from the latched position to the unlatched position.

17. A buckle for a child safety seat harness comprising:
a base part having a first flange;

a post structure connected to the base part, the post structure having a first magnetic element and a second flange;

a latch part having an opening configured to receivably engage the post structure;

a slide assembly moveably connected to the latch part and having a second magnetic element and a third magnetic element moveable between opposing latched and unlatched positions, movement of the slide assembly to the latched position engaging the first flange and the second flange, and aligning the first magnetic element and the second magnetic element in a magnetically attracting configuration to attract the latch part into engagement with the base part, movement of the slide part to the unlatched position disengaging the first flange and the second flange and aligning the first magnetic element and the third magnetic element into a magnetically repelling configuration to urge the latch part out of engagement with the base part.

18. The buckle of claim 17, wherein the slide assembly further comprises:

a catch slide bi-directionally moveable along a slide axis between the latched and unlatched positions and configured to engage the first and second flanges to retain the latch assembly in engagement with the base part when the catch slide is in the latched position, the catch slide being biased toward the latched position; and a magnetic slide bi-directionally moveable relative to the catch slide in a direction parallel to the slide axis between engaging and releasing positions, the magnetic slide being biased toward the engaging position, wherein the catch slide is configured so that continued movement of the magnetic slide toward the releasing position causes movement of the catch slide toward the unlatched position and disengagement of the catch slide from the first and second flanges.

* * * * *